United States Patent
Shiota et al.

(10) Patent No.: US 10,935,393 B2
(45) Date of Patent: Mar. 2, 2021

(54) GAS METER SYSTEM

(71) Applicant: Panasonic Intellectual Property Management Co., Ltd., Osaka (JP)

(72) Inventors: Kazuki Shiota, Kyoto (JP); Tadanori Shirasawa, Nara (JP); Nobuaki Murabayashi, Osaka (JP); Yoshikuni Tamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/647,871

(22) PCT Filed: Nov. 15, 2018

(86) PCT No.: PCT/JP2018/042216
§ 371 (c)(1),
(2) Date: Mar. 16, 2020

(87) PCT Pub. No.: WO2019/107161
PCT Pub. Date: Jun. 6, 2019

(65) Prior Publication Data
US 2020/0284613 A1    Sep. 10, 2020

(30) Foreign Application Priority Data
Nov. 30, 2017  (JP) .............................. JP2017-229830

(51) Int. Cl.
*G01D 4/00* (2006.01)
*G01F 1/34* (2006.01)
(Continued)

(52) U.S. Cl.
CPC ............... *G01D 4/004* (2013.01); *G01F 1/34* (2013.01); *G01F 15/002* (2013.01);
(Continued)

(58) Field of Classification Search
None
See application file for complete search history.

(56) References Cited

U.S. PATENT DOCUMENTS

2010/0326548 A1* 12/2010 Miyata ..................... G07C 3/00
                                                                   137/561 R
2018/0112872 A1*  4/2018 Hishinuma ............... F23N 5/00

FOREIGN PATENT DOCUMENTS

JP            9-149464         6/1997

OTHER PUBLICATIONS

International Search Report of PCT application No. PCT/JP2018/042216 dated Feb. 19, 2019.

* cited by examiner

*Primary Examiner* — Adolf Dsouza
(74) *Attorney, Agent, or Firm* — Wenderoth, Lind & Ponack, L.L.P.

(57) ABSTRACT

A gas meter and a center device, including an analyzer, analyze a cause of an abnormality determination. The center device requests analysis-use data necessary to analyze the cause of the abnormality determination from the gas meter, through a communication by a center communication unit, based on the abnormality type data received from the gas meter. The gas meter transmits the analysis-use data requested by the center device to the center device by a meter communication unit, and the analyzer of the center device determines the cause of the abnormality determination based on the received analysis-use data.

4 Claims, 3 Drawing Sheets

(51) Int. Cl.
  *G01F 15/00* (2006.01)
  *G01F 15/06* (2006.01)
  *H04Q 9/00* (2006.01)
(52) U.S. Cl.
  CPC .......... *G01F 15/003* (2013.01); *G01F 15/063* (2013.01); *H04Q 9/00* (2013.01)

GAS METER SYSTEM

CROSS-REFERENCE TO RELATED APPLICATIONS

This application is a U.S. national stage application of the PCT International Application No. PCT/JP2018/042216 filed on Nov. 15, 2018, which claims the benefit of foreign priority of Japanese patent application No. 2017-229830 filed on Nov. 30, 2017, the contents all of which are incorporated herein by reference.

TECHNICAL FIELD

The present invention relates to a gas meter system configured with: a gas meter that has a shut-off function of gas and has a function to transmit, when the gas meter has shut off gas, a reason for the shut-off; and a center device that analyzes a cause of the shut-off.

BACKGROUND ART

As a gas meter system of this type, there are conventionally a general reason display and an automatic notification device. To the automatic notification device, there is connected a meter that outputs, when gas is shut off, shut-off reason data corresponding to a reason for the shut-off, and the automatic notification device automatically informs a center device based on the shut-off reason data. In this automatic notification device, when the shut-off reason data has been output, a general reason of the reason for shut-off corresponding to the shut-off reason data is displayed on the general reason display, and the automatic notification device displays a detailed reason of the reason for shut-off (for example, see PTL 1).

With the automatic notification device described in PTL 1, a maintenance person can easily grasp the reason for shut-off by checking the display on the automatic notification device and does not have to check the display on the gas meter installed in the outdoors or to make a phone call to an information center to check the reason for shut-off, and can perform a dealing process on site easily and quickly, whereby convenience is improved.

CITATION LIST

Patent Literature

PTL 1: Unexamined Japanese Patent Publication No. H9-149464

SUMMARY OF THE INVENTION

However, in the conventional configuration, since the automatic notification device operates based only on the shut-off reason data from the gas meter, the detailed reason of the shut-off is only selected from a previously stored list of detailed reasons for shut-off, and there is a limitation in the display contents. In particular, regarding gas meters in recent years, "reasons for abnormality" and "abnormality solving methods" with respect to an occurrence of alarm and shut-off have become complicated with an increase in the number of functions and an increase in functionality of the meter, and there is a problem that workers cannot make an appropriate determination.

The present invention provides a gas meter system in which a center device analyzes, based on a reason for abnormality, a cause by which the determination of abnormality was made, so that an appropriate measure can be taken.

A gas meter system of the present invention includes a gas meter and a center device. The gas meter includes any of a flow rate measurement unit that measures a flow rate of gas, a seismic intensity measurement unit that measures vibration, and a pressure measurement unit that measures a pressure of the gas. The gas meter includes: an abnormality determination unit that determines that there is an abnormality, based on a measurement value measured by the any of the flow rate measurement unit, the seismic intensity measurement unit, and the pressure measurement unit and that outputs abnormality type data indicating a type of the abnormality; a gas shut-off unit that shuts off supply of the gas; and a meter communication unit that communicates with outside. The center device includes a center communication unit that communicates with the meter communication unit; and analyzer that analyzes a cause of the determination of abnormality on the gas meter. The center device requests analysis-use data necessary to analyze the cause from the gas meter through a communication by the center communication unit based on the abnormality type data received from the gas meter. The gas meter transmits to the center device the analysis-use data requested from the center device through the meter communication unit. The analyzer determines the cause of the determination of abnormality based on the analysis-use data received by the center communication unit.

With this configuration, the center device analyzes the analysis-use data requested by the center device and obtained from the gas meter, so that the gas meter system of the present invention can minutely analyze the cause by which the gas meter determined that there was an abnormality; therefore, it is possible to take an appropriate measure on the occurrence of the abnormality.

DESCRIPTION OF EMBODIMENTS

Hereinafter, exemplary embodiments of the present invention will be described with reference to the drawings. Note that the present invention is not limited to the exemplary embodiments.

First Exemplary Embodiment

Figure 1:
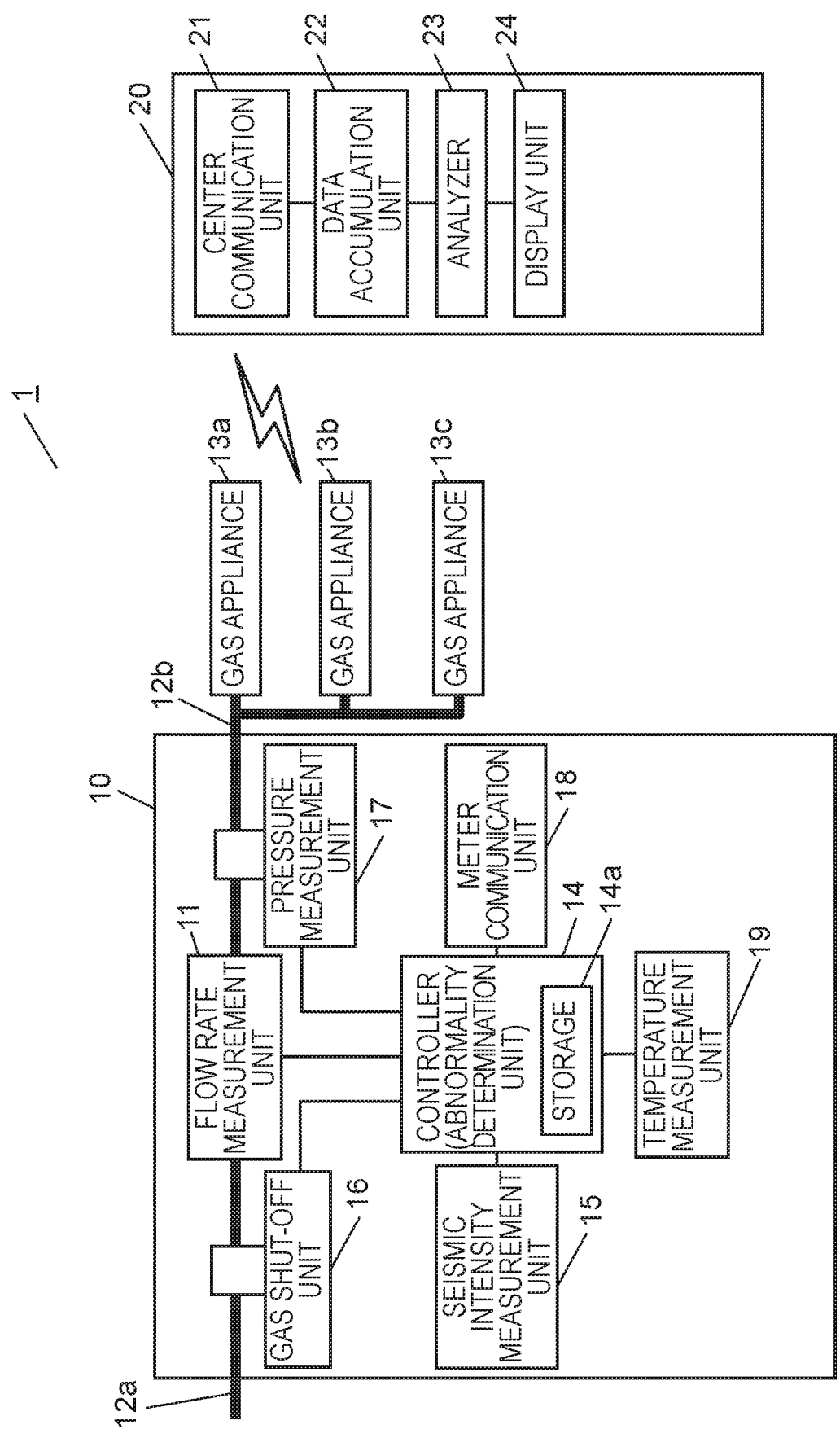
FIG. 1 is a block diagram of a gas meter system according to a first exemplary embodiment and a second exemplary embodiment of the present invention.

FIG. 1 is a block diagram of a gas meter system according to a first exemplary embodiment of the present invention.

With reference to FIG. 1, gas meter system 1 is configured with: gas meter 10 installed in a user's home; and center device 20. Note that gas meter 10 is installed in each user's home, and there are a plurality of gas meters 10; however, only one gas meter 10 is cited and described in the present exemplary embodiment.

Gas meter 10 has inflow pipe 12a and outflow pipe 12b for gas, and flow rate measurement unit 11 is provided on a route from inflow pipe 12a to outflow pipe 12b. Further, a plurality of gas appliances 13a, 13b, 13c are connected on a downstream side of outflow pipe 12b.

Flow rate measurement unit 11 detects and outputs a flow rate of gas, and measures an instantaneous flow rate at predetermined intervals (for example, every 0.5 seconds).

Controller 14 integrates gas usage based on flow rate data measured by flow rate measurement unit 11. Alternatively, controller 14 obtains seismic intensity information from seismic intensity measurement unit 15, and when a seismic intensity of an earthquake is determined to be greater than or equal to a predetermined seismic intensity, controller 14 causes gas shut-off unit 16 provided on inflow pipe 12a to shut off gas. Further, controller 14 has a function as an abnormality determination unit that obtains a pressure value from pressure measurement unit 17 to make a determination of a pressure drop abnormality, and the function as the abnormality determination unit can be realized by a microcomputer.

Storage 14a stores a pressure value measured by pressure measurement unit 17, a seismic intensity value detected by seismic intensity measurement unit 15, a temperature value measured by temperature measurement unit 19, or various types of abnormality determination values, for example. Storage 14a is configured with a random-access memory (RAM) built in a microcomputer constituting controller 14. Note that as storage 14a, a storage device provided separately and independently from controller 14 may be used.

Meter communication unit 18 obtains, from controller 14, an integrated value of gas usage obtained by flow rate measurement unit 11, measurement conditions of flow rate measurement unit 11, and the like, and transmits the integrated value, the measurement conditions, and the like to center device 20.

Further, meter communication unit 18 transmits to the center device abnormality type data indicating a type of the abnormality determined by controller 14 and various types of data based on which controller 14 determined that there was an abnormality. Further, meter communication unit 18 also transmits to center device 20 the pressure value obtained from pressure measurement unit 17, the seismic intensity obtained by seismic intensity measurement unit 15, in addition, the ambient temperature of the gas meter obtained by temperature measurement unit 19, or a temperature of the gas as the information obtained by gas meter 10.

Here, the various types of data based on which controller 14 determined that there was an abnormality are the flow rate data and the measurement conditions of flow rate measurement unit 11, for examples. Examples of the measurement conditions of flow rate measurement unit 11 include, in a case where flow rate measurement unit 11 uses a measurement method using ultrasound, an amplification factor of amplification of a received wave and a propagation time of ultrasound, and the like. The measurement conditions of the flow rate measurement unit 11 mean various types of data with which it can be checked whether there is an abnormality with the measurement system, and are not limited to the gain of the amplifier circuit and the propagation time. Such data as described above is also stored in storage 14a.

Meanwhile, center device 20 includes: center communication unit 21 to communicate with meter communication unit 18 of gas meter 10; data accumulation unit 22 that accumulates received data; analyzer 23 that performs analysis by using various types of data accumulated in data accumulation unit 22; and display unit 24 that displays based on an analytical result of analyzer 23.

Figure 2:
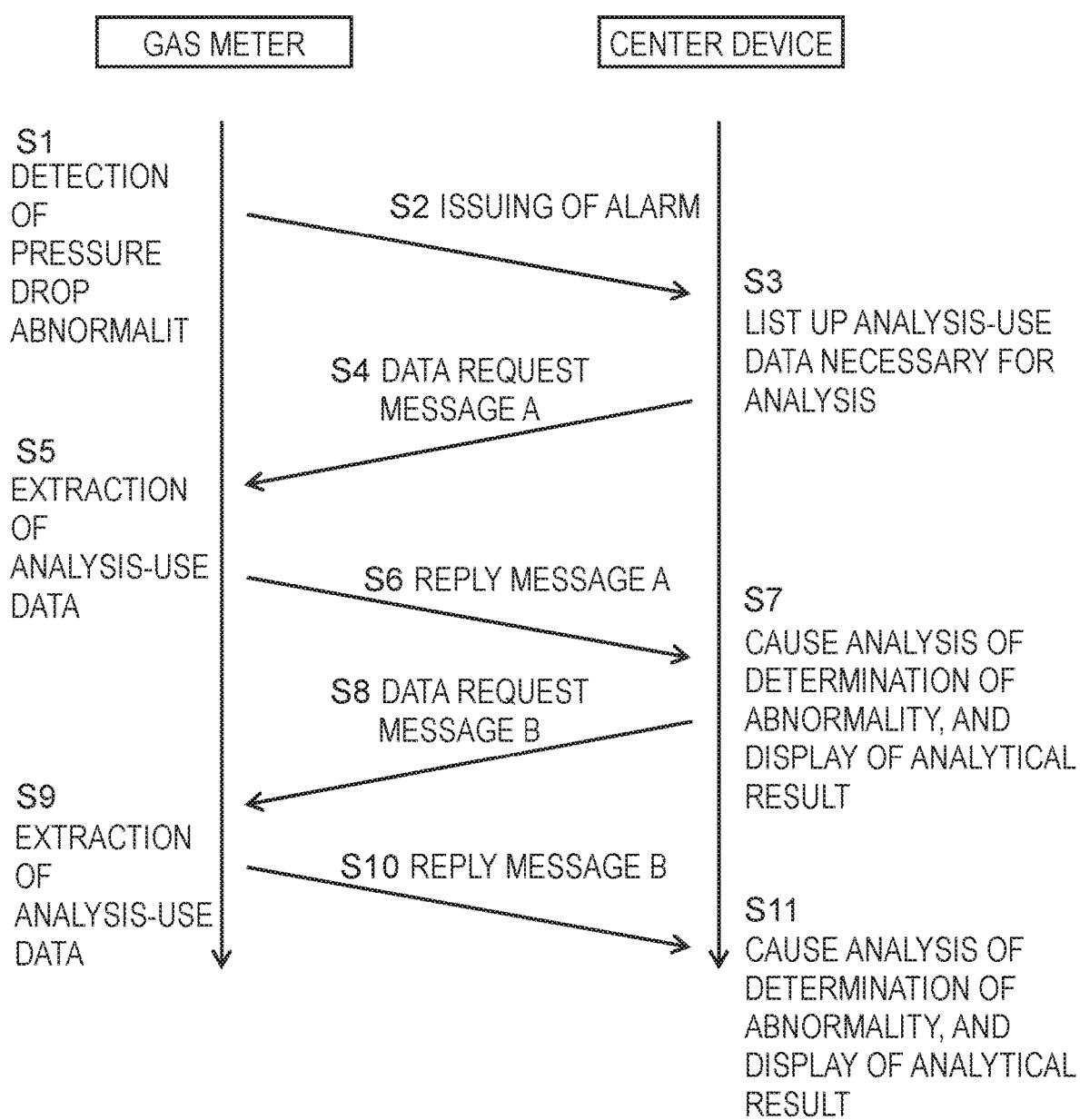
FIG. 2 is a sequence diagram for describing an operation of the gas meter system according to the first exemplary embodiment of the present invention.

Next, operations of gas meter 10 and center device 20 of the gas meter system of the present exemplary embodiment will be described with reference to FIG. 2. FIG. 2 is a sequence diagram illustrating a communication sequence between gas meter 10 and center device 20 at a time of a pressure drop abnormality.

First, in step S1, the abnormality determination unit of controller 14 determines that the pressure measured by pressure measurement unit 17 has become lower than or equal to a previously set predetermined value, and outputs abnormality type data indicating a pressure drop abnormality. Next, in step S2, a message that is abnormality type data and indicates that there occurred a pressure drop abnormality is transmitted from gas meter 10 to center device 20 through meter communication unit 18 (issuing of alarm).

Next, in step S3, center device 20 receives through center communication unit 21 this message including the abnormality type data and realizes that gas meter 10 detected an abnormality, and center device 20 lists up analysis-use data necessary to analyze a cause by which to the pressure drop abnormality was caused. The analysis-use data to be listed up is a current pressure value, a pressure-abnormality determination value having been set value, and a pressure determination value (pressure-recovery determination value) at the time of automatic restoration. Then, in step S4, center device 20 transmits data request message A to request the analysis-use data necessary to analyze the cause, by which the abnormality was caused, to gas meter 10 through center communication unit 21.

Next, in step S5, gas meter 10 receives data request message A and then extracts, based on the data request message A, a current pressure value, a pressure-abnormality determination value, and a pressure-recovery determination value from the data stored in storage 14a, as the analysis-use data. Then, in step S6, gas meter 10 transmits the analysis-use data extracted in step S5 to center device 20 while putting the analysis-use data in reply message A.

Next, in step S7, center device 20 receives reply message A and then analyzes the cause of the determination of abnormal on gas meter 10, based on the current pressure value, the pressure-abnormality determination value, and the pressure-recovery determination value, and center device 20 analyzes, by analyzer 23, about whether there is a question in the determination of abnormality and about how to restore, and displays an analytical result on display unit 24.

Further, if center device 20 determines that the data received with reply message A is not enough for clear determination or solution, center device 20 transmits to gas meter 10, for example, the temperature data at the time of the determination of shut-off as data request message B, which is a request for additional analysis-use data, in step S8. Then, controller 14 of gas meter 10 extracts in step S9 the analysis-use data requested by data request message B; and, in step S10, the analysis-use data extracted in step S9 is transmitted to center device 20 while being put in reply message B. Next, in step S11, center device 20 receives from gas meter 10 the temperature data included in reply message B as the analysis-use data, and center device 20 can further analyze, using the obtained temperature data.

In a display example of display unit 24, a terminal of the center device displays "Settings are made such that gas is shut off if pressure drops down to xxx Pa. Current pressure is yyy Pa. Determination of shut-off is correctly made. Pressure needs to further increase by zzz Pa for restoration." This display enables an operator to know that gas meter 10 correctly performed pressure drop shut-off and to know how to restore from the shut-off. Thus, it is possible to appropriately instruct a worker at the site and to accurately answer a question from a user.

Note that present exemplary embodiment has described about the pressure drop shut-off due to a pressure drop, based on the measurement value of pressure measurement unit 17. However, also in other cases than the shut-off due to pressure drop, a similar analysis performed by center device 20 enables accurate analyses about shut-off due to an occurrence of an earthquake detected by seismic intensity measurement unit 15 and about an abnormality related to a flow rate measured by flow rate measurement unit 11. Further, it is also possible to analyze an abnormality based on a combination of the respective measurement values of flow rate measurement unit 11, seismic intensity measurement unit 15, and pressure measurement unit 17, in a similar manner.

Further, in the above description, the gas meter system is configured such that data is transmitted from gas meter 10 in response to the request from center device 20; however, if the configuration is made such that basic data specified by data request message A and necessary for analysis is transmitted simultaneously when the alarm is issued from gas meter 10 in step S2, the communications can be simplified.

As described above, in the present exemplary embodiment, since center device 20 analyzes the data which was obtained from gas meter 10 and based on which gas meter 10 determined that there was an abnormality, it is possible to minutely analyze the cause by which gas meter 10 determined that there was an abnormality. Therefore, it is possible to take an appropriate measure on the occurrence of the abnormality.

Second Exemplary Embodiment

Figure 3:
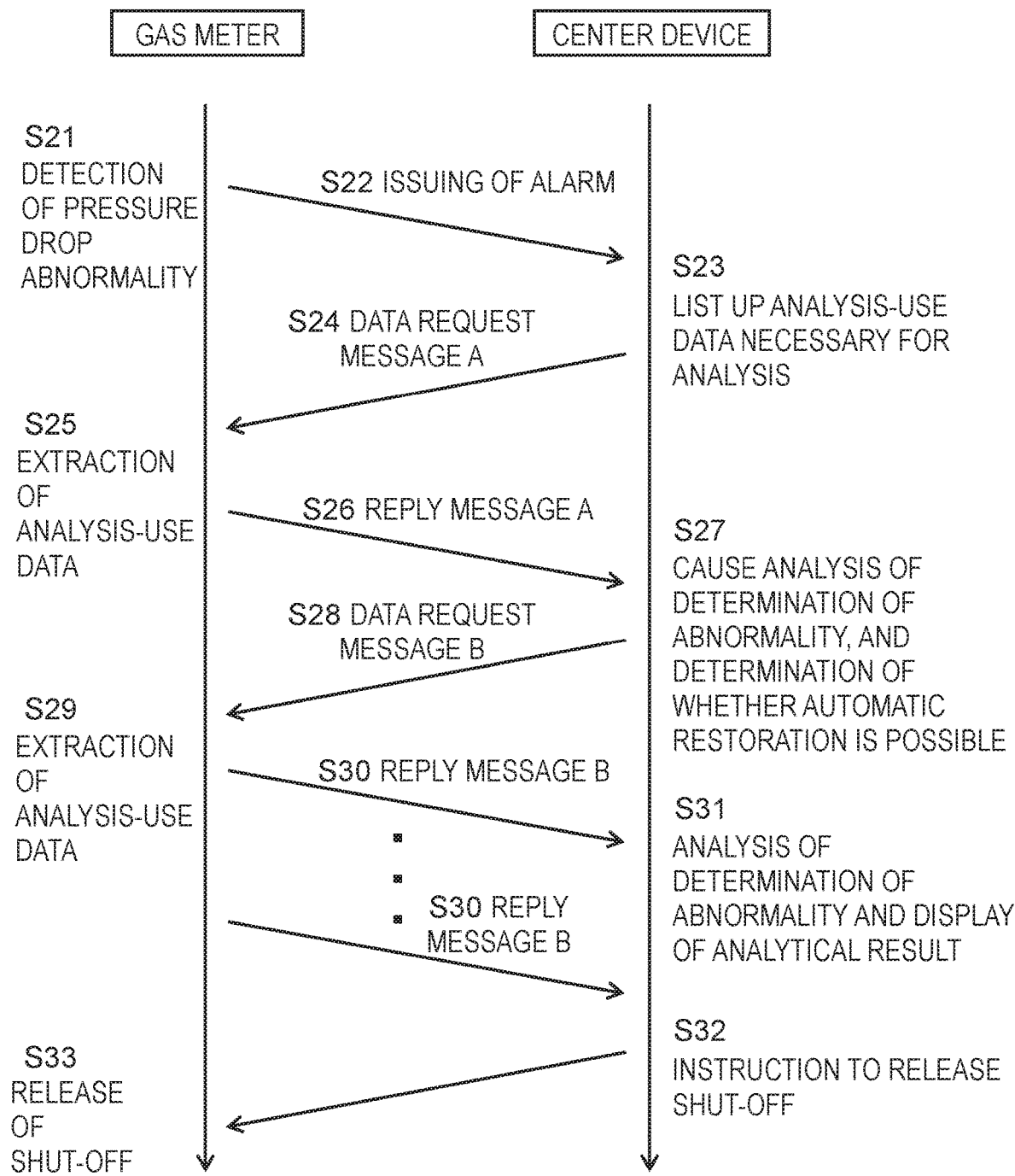
FIG. 3 is a sequence diagram for describing an operation of the gas meter system according to the second exemplary embodiment of the present invention.

Next, with reference to the communication sequence shown in FIG. 3, operations of gas meter 10 and center device 20 of the gas meter system of a second exemplary embodiment will be described. Note that configurations of gas meter 10 and center device 20 are the same as the configuration of the gas meter system of the first exemplary embodiment shown in FIG. 1.

First, in step S21, the abnormality determination unit of controller 14 determines that a pressure detected by pressure measurement unit 17 has become lower than or equal to a previously set predetermined value, and outputs abnormality type data indicating a pressure drop abnormality. Next, in step S22, a message that is abnormality type data and indicates that there is a pressure drop abnormality is transmitted from gas meter 10 to center device 20 through meter communication unit 18 (issuing of alarm).

Next, in step S23, center device 20 receives through center communication unit 21 this message including the abnormality type data and realizes that gas meter 10 detected an abnormality, and center device 20 lists up analysis-use data necessary to analyze a cause by which the pressure drop abnormality was caused. The analysis-use data to be listed up is a current pressure value, a pressure-abnormality determination value having been set value, and a pressure determination value (pressure-recovery determination value) at the time of automatic restoration. Then, in step S24, center device 20 transmits data request message A for asking for analysis-use data necessary to analyze the cause by which the abnormality was caused, to gas meter 10 through center communication unit 21.

Next, in step S25, based on the data request message A, gas meter 10 having received data request message A extracts a current pressure value, a pressure-abnormality determination value, and a pressure-recovery determination value from the data stored in storage 14a as the analysis-use data. Then, in step S26, gas meter 10 transmits the analysis-use data extracted in step S25 to center device 20 while putting the analysis-use data in reply message A.

Next, in step S27, center device 20 receives reply message A and then analyzes the cause of the determination of abnormality on gas meter 10 based on the current pressure value, the pressure-abnormality determination value, and the pressure-recovery determination value, and center device 20 performs an analysis about whether there is a question in the determination of abnormality and determines whether restoration without human intervention (automatic restoration) is possible. Further, if the automatic restoration is determined to be possible, a condition for restoration is determined, and center device 20 transmits, in step S28, to gas meter 10 a request for pressure data based on which a determination of restoration is made, while putting the request in data request message B.

Next, in step S29, gas meter 10 receives data request message B and extracts the pressure data that is requested by data request message B and is analysis-use data; and, in step S30, gas meter 10 transmits the pressure data to center device 20 while putting the pressure data in reply message B as a reply to data request message B. Note that the transmission of reply message B in step S30 is not limited to only once but is repeated for a plurality of times in response to the request from center device 20.

Next, in step S31, center device 20 receives reply message B and then performs an analysis of the cause of the determination of abnormality and displays an analytical result. For example, if it is determined that the pressure has become extremely low with respect to the pressure-drop determination value (850 hPa) in association with a breakage of pipe or the like, restoration is determined to be impossible, and such a determination is reported on a display or the like. Alternatively, if the pressure is slightly lower than the pressure-drop determination value (for example, the pressure is 800 hPa), center device 20 determines that the pressure drop is temporary and that the automatic restoration is possible. After that, center device 20 periodically requests gas meter 10 for the pressure value, and if the received pressure value reaches the restoration determination pressure (1150 hPa), the center device 20 instructs gas meter 10 to restore in step S32, and gas meter 10 releases the shut-off in step S33.

Note that if gas meter 10 is previously instructed to periodically transmit the pressure data, center device 20 does not have to periodically transmit the data request message. Thus, the data request message B shown in FIG. 3 is not issued from center device 20, and step S30 does not occur.

In the present exemplary embodiment, the description has been given to the pressure drop shut-off due to a pressure drop. However, in a case of shut-off caused by an occurrence of an earthquake detected by seismic intensity measurement unit 15, center device 20 makes a determination based on data of a magnitude of the earthquake and a state of continuous aftershocks so that it is possible to perform automatic restoration while safety is being secured.

Further, also regarding the shut-off due to an abnormality based on the measurement value of flow rate measurement unit 11, center device 20 performs an analysis whether the abnormality was determined due to break-down of the measurement system or due to a temporal change due to external noises or the like so that an accurate determination can be made.

Note that, in the above description, the gas meter system is configured such that the analysis-use data is transmitted from gas meter 10 in response to the request from center device 20; however, if the configuration is made such that basic analysis-use data specified by data request message A and necessary for analysis is transmitted simultaneously when the alarm is issued from gas meter 10, the communications can be simplified.

As described above, with the present exemplary embodiment, the abnormality type data obtained from gas meter 10 is analyzed by center device 20, so that it is possible to minutely analyze the cause by which gas meter 10 determined that there was an abnormality, to determine whether the automatic restoration is possible and so that it is possible to instruct to release the shut-off when the condition on which restoration is possible is satisfied. Therefore, if gas meter 10 itself does not have a function for automatic restoration, center device 20 can instruct to restore.

As described above, the gas meter system of a first disclosure includes a gas meter and a center device. The gas meter includes any of a flow rate measurement unit that measures a flow rate of gas, a seismic intensity measurement unit that measures vibration, and a pressure measurement unit that measures a pressure of the gas. The gas meter includes: an abnormality determination unit that determines that there is an abnormality, based on a measurement value measured by the any of the flow rate measurement unit, the seismic intensity measurement unit, and the pressure measurement unit and that outputs abnormality type data indicating a type of the abnormality; a gas shut-off unit that shuts off supply of the gas; and a meter communication unit that communicates with outside. The center device includes: a center communication unit that communicates with the meter communication unit; and analyzer that analyzes a cause of the determination of abnormality made by the gas meter. The center device requests analysis-use data necessary to analyze the cause from the gas meter through a communication by the center communication unit based on the abnormality type data received from the gas meter. The gas meter transmits to the center device the analysis-use data requested from the center device through the meter communication unit. The analyzer determines the cause of the determination of abnormality based on the analysis-use data received by the center communication unit.

Thus, since the center device minutely analyzes the analysis-use data obtained from the gas meter, it is possible to minutely analyze the cause by which the gas meter determined that there was an abnormality. Therefore, it is possible to take an appropriate measure on the occurrence of the abnormality.

A gas meter system in a second disclosure may be configured particularly in the first disclosure as follows. When the abnormality determination unit has determined that there was a specific abnormality, the gas meter shuts off the gas by the gas shut-off unit, and when the gas meter has shut off the gas, the center device reports how to restore from the shut-off, based on a result of the specifying of the cause of the abnormality.

A gas meter system in a third disclosure may be configured in the first disclosure as follows. When the abnormality determination unit has determined that there was a specific abnormality, the gas meter shuts off the gas by the gas shut-off unit, and when the gas meter has shut off the gas, the center device determines a condition for restoration from the shut-off, based on a result of the specifying of the cause of the abnormality, and when the condition for restoration from the shut-off is satisfied, the center device instructs the gas meter to release the shut-off.

A gas meter system in a fourth disclosure may be configured in any one of the first to third disclosures as follows. The gas meter transmits a reason for abnormality and the measurement value based on which the abnormality determination unit determined that there was an abnormality, and when the cause of the abnormality cannot be specified based on the measurement value obtained from the gas meter, the center device requests the gas meter for analysis-use data necessary for specifying the cause.

INDUSTRIAL APPLICABILITY

As described above, a gas meter system according to the present invention enables various types of analyses to be performed by using analysis-use data measured by a gas meter. Therefore, the gas meter system according to the present invention is applicable to a gas meter not only for household use but also for business use.

REFERENCE MARKS IN THE DRAWINGS 1 gas meter system
10 gas meter
11 flow rate measurement unit
14 controller (abnormality determination unit)
15 seismic intensity measurement unit
16 shut-off unit
17 pressure measurement unit
18 meter communication unit
20 center device
21 center communication unit
22 data accumulation unit
23 analyzer
24 display unit

The invention claimed is:
1. A gas meter system comprising:
a gas meter, the gas meter including:
    any of a flow rate measurement unit that measures a flow rate of gas, a seismic intensity measurement unit that measures vibration, and a pressure measurement unit that measures a pressure of the gas;
    an abnormality determination unit that determines that there is an abnormality, based on a measurement value measured by the any of the flow rate measurement unit, the seismic intensity measurement unit, and the pressure measurement unit and that outputs abnormality type data indicating a type of the abnormality;
    a gas shut-off unit that shuts off supply of the gas; and
    a meter communication unit that communicates with outside; and
a center device, the center device including:
    a center communication unit that communicates with the meter communication unit; and
    an analyzer that analyzes a cause of the determination of abnormality in the gas meter,
wherein the center device requests analysis-use data necessary to analyze the cause from the gas meter, through a communication by the center communication unit, based on the abnormality type data received from the gas meter, wherein the gas meter transmits the analysis-use data requested by the center device to the center device by the meter communication unit, and wherein the analyzer determines the cause of the determination of abnormality, based on the analysis-use data received by the center communication unit.

2. The gas meter system according to claim 1, wherein when the abnormality determination unit has determined that there was a specific abnormality, the gas meter shuts off the gas by the gas shut-off unit, and when the gas meter has shut off the gas, the center device reports how to restore from the shut-off, based on a result of the specifying of the cause of the abnormality.

3. The gas meter system according to claim 1, wherein when the abnormality determination unit has determined that there was a specific abnormality, the gas meter shuts off the gas by the gas shut-off unit, and when the gas meter has shut off the gas, the center device determines a condition for restoration from the shut-off, based on a result of the specifying of the cause of the abnormality, and when the condition for restoration from the shut-off is satisfied, the center device instructs the gas meter to release the shut-off.

4. The gas meter system according to claim 1, wherein the gas meter transmits a reason for the abnormality and the measurement value based on which the abnormality determination unit determined that there was an abnormality, and when the cause of the abnormality cannot be specified based on the measurement value obtained from the gas meter, the center device requests the gas meter for analysis-use data necessary for specifying the cause.

\* \* \* \* \*